US008330408B2

(12) United States Patent
Bickey

(10) Patent No.: US 8,330,408 B2
(45) Date of Patent: Dec. 11, 2012

(54) METHOD AND APPARATUS FOR INCREASING THE RUN TIME OF AN ELECTRIC CART

(76) Inventor: Daniel Bickey, Beaver, WV (US)

( * ) Notice: Subject to any disclaimer, the term of this patent is extended or adjusted under 35 U.S.C. 154(b) by 181 days.

(21) Appl. No.: 11/822,092

(22) Filed: Jul. 2, 2007

(65) Prior Publication Data

US 2008/0018270 A1 Jan. 24, 2008

Related U.S. Application Data

(60) Provisional application No. 60/817,363, filed on Jun. 30, 2006.

(51) Int. Cl.
*H02P 7/14* (2006.01)
(52) U.S. Cl. .................... 318/504; 318/479
(58) Field of Classification Search ............ 318/478, 318/479, 504
See application file for complete search history.

(56) References Cited

U.S. PATENT DOCUMENTS

| | | | | |
|---|---|---|---|---|
| 3,853,174 A * | 12/1974 | Kramer | ............ | 165/287 |
| 3,941,198 A * | 3/1976 | Kappas | ............ | 180/11 |
| 4,019,106 A * | 4/1977 | Van Doren | ............ | 318/252 |
| 4,161,023 A * | 7/1979 | Goffeau | ............ | 363/124 |
| 4,225,812 A | 9/1980 | Kraus | | |
| 4,470,678 A | 9/1984 | Mashimo | | |
| 4,563,621 A * | 1/1986 | Moore | ............ | 318/139 |
| 4,580,090 A * | 4/1986 | Bailey et al. | ............ | 323/303 |
| 5,350,982 A * | 9/1994 | Seib | ............ | 318/139 |
| 5,416,391 A * | 5/1995 | Correa et al. | ............ | 318/558 |
| 5,796,225 A | 8/1998 | Fini, Jr. | | |
| 5,818,207 A * | 10/1998 | Hwang | ............ | 323/288 |
| 6,008,999 A * | 12/1999 | Marrero | ............ | 363/21.01 |
| 6,259,587 B1 * | 7/2001 | Sheldon et al. | ............ | 361/23 |
| 6,268,711 B1 | 7/2001 | Bearfield | | |
| 6,559,625 B2 * | 5/2003 | Freund et al. | ............ | 323/282 |
| 6,559,689 B1 * | 5/2003 | Clark | ............ | 327/97 |
| 6,646,407 B2 * | 11/2003 | Rahman et al. | ............ | 318/701 |
| 6,798,162 B2 * | 9/2004 | Makaran et al. | ............ | 318/442 |
| 7,012,400 B2 * | 3/2006 | Yu | ............ | 318/800 |
| 7,279,874 B2 * | 10/2007 | Masuda | ............ | 323/282 |
| 7,292,081 B2 * | 11/2007 | Takegami | ............ | 327/172 |
| 2003/0006727 A1 * | 1/2003 | Goto et al. | ............ | 318/442 |

* cited by examiner

*Primary Examiner* — Bentsu Ro
(74) *Attorney, Agent, or Firm* — Sughrue Mion, PLLC

(57) ABSTRACT

A method and apparatus for improving the run duration of an electric motor powered by a battery pack is provided. The apparatus includes an electric motor having a rated motor voltage, a battery pack having an output voltage exceeding the rated motor voltage, and a motor controller which converts the output voltage to supply electrical power to the electric motor at the rated motor voltage.

23 Claims, 9 Drawing Sheets

BATTERY PERFORMANCE COMPARISON AT GOULD'S ELECTRIC   128V BATTERY

| | |
|---|---|
| BATTERY TYPE | CROWN 64-90-21 |
| NUMBER OF CELLS | 64 |
| CELL TYPE | LEAD ACID |
| CELL DIMENSIONS | N/A |
| AVERAGE VOLTAGE OF EACH CELL | 2.13V |
| TOTAL VOLTAGE OF BATTERY 68.1 + 68.2 | 136.3V |

MOTOR TEST INFORMATION WITH A 30HP LOAD AND 110V OUTPUT

| TIME | SPECIFIC GRAVITY | AVE INT. TEMP | BATTERY VOLTS | AVE V PER CELL | BATTERY AMPS | LOAD (kW) |
|---|---|---|---|---|---|---|
| START: 8:45AM | | | | | | |
| 15 MIN: | 1280 | 85F | 123.4 | 1.928 | 246 | 30.36 |
| 30 MIN: | 1270 | 90F | 123.3 | 1.927 | 246 | 30.33 |
| 45 MIN: | 1260 | 94F | 122 | 1.906 | 260.4 | 31.77 |
| 60 MIN: | 1245 | 96F | 120.7 | 1.886 | 265 | 31.99 |
| 75 MIN: | 1239 | 97F | 119 | 1.859 | 275 | 32.73 |
| 90 MIN: IGBT DUTY CYCLE AT 100% AT 100 MINUTES | 1215 | 99F | 117.2 | 1.831 | 277.5 | 32.52 |
| 105 MIN: | 1207 | 100F | 114.9 | 1.759 | 290.6 | 33.39 |
| 120 MIN: | 1185 | 101F | 112.3 | 1.755 | 291 | 32.68 |
| 135 MIN: SHUT DOWN TO DUE TO UV AT 11:00AM, UV SET AT 80V | 1175 | 104F | 107.9 | 1.686 | 301.5 | 32.93 |
| 150 MIN: | 1163 | 106F | 80 | 1.25 | 370 | 29.6 |
| 165 MIN: | | | | | | |
| 180 MIN: | | | | | | |
| TOTAL RUN TIME: 2:15 | | | | | | |

FIG. 5

BATTERY PERFORMANCE COMPARISON AT GOULD'S ELECTRIC    152V BATTERY

BATTERY TYPE                        CROWN 76-100-19
NUMBER OF CELLS                     76
CELL TYPE                           LEAD ACID
CELL DIMENSIONS                     N/A
AVERAGE VOLTAGE OF EACH CELL        2.15V
TOTAL VOLTAGE OF BATTERY 82 + 81.7  163.7V

MOTOR TEST INFORMATION WITH A 30HP LOAD AND 110V OUTPUT

| TIME | SPECIFIC GRAVITY | AVE INT. TEMP | BATTERY VOLTS | AVE V PER CELL | BATTERY AMPS | LOAD (KW) |
|---|---|---|---|---|---|---|
| START: 8:25AM | 1310 | 96F | 150.5 | 1.98 | 200 | 30.10 |
| 15 MIN: | 1300 | 96F | 151.4 | 1.992 | 205.2 | 31.07 |
| 30 MIN: | 1300 | 96F | 150.5 | 1.98 | 213.5 | 32.13 |
| 45 MIN: SG APPROXIMATELY 1280 AT 52 MINUTES | 1287 | 102F | 149.8 | 1.971 | 214.8 | 32.18 |
| 60 MIN: | 1270 | 105F | 148.7 | 1.957 | 220 | 32.71 |
| 75 MIN: | 1255 | 105F | 147.7 | 1.943 | 222.8 | 32.91 |
| 90 MIN: | 1242 | 105F | 146.6 | 1.929 | 224.7 | 32.94 |
| 105 MIN: | 1239 | 106F | 145.4 | 1.913 | 226 | 32.86 |
| 120 MIN: | 1225 | 107F | 144.1 | 1.896 | 230 | 33.14 |
| 135 MIN: | 1207 | 110F | 142.5 | 1.875 | 232 | 33.06 |
| 150 MIN: | 1198 | 111F | 140.9 | 1.854 | 235.5 | 33.18 |
| 165 MIN: | 1176 | 113F | 138.8 | 1.826 | 240.9 | 33.44 |
| 180 MIN: | 1170 | 113F | 135.9 | 1.788 | 246 | 33.43 |
| 195 MIN: IGBT DUTY CYCLE AT 100% AT 207 MINUTES | 1152 | 116F | 131.8 | 1.734 | 257.5 | 33.94 |
| 209 MIN: 11:54AM SHUT DOWN DUE TO UV. UV SET AT 80V | 1137 | 118F | 80 | 1.053 | 390 | 31.20 |

TOTAL RUN TIME: 3:29
TOTAL RUN TIME AFTER GRAVITY REACHED 1280 WAS 157 MINUTES

FIG. 6

BATTERY TYPE                      CROWN 64-125-25
NUMBER OF CELLS                   64
CELL TYPE                         LEAD ACID
CELL DIMENSIONS                   N/A
AVERAGE VOLTAGE OF EACH CELL      2.13V
TOTAL VOLTAGE OF BATTERY          136.3V

MOTOR TEST INFORMATION WITH A 30HP LOAD AND 110V OUTPUT

| TIME | SPECIFIC GRAVITY | AVERAGE INTERNAL TEMPERATURE | BATTERY VOLTS | BATTERY AMPS |
|---|---|---|---|---|
| START: 9:55AM | 1285 | 75F | 124.5 | 249.3 |
| 15 MIN: | 1265 | 79F | 124.2 | 256 |
| 30 MIN: | 1260 | 80F | 123.7 | 259.5 |
| 45 MIN: | 1255 | 82F | 123.2 | 261 |
| 60 MIN: | 1240 | 86F | 122.6 | 265.8 |
| 75 MIN: | 1235 | 88F | 121.8 | 271.4 |
| 90 MIN: | 1230 | 88F | 121.1 | 272.8 |
| 105 MIN: | 1215 | 90F | 120.1 | 278.4 |
| 120 MIN: | 1210 | 90F | 119.5 | 279.5 |
| 135 MIN: | 1200 | 90F | 118.6 | 280.4 |
| 150 MIN: | 1190 | 96F | 117.7 | 282.7 |
| 165 MIN: | 1185 | 98F | 116.6 | 285.3 |
| 180 MIN: | 1180 | 100F | 115.3 | 292.2 |
| 195 MIN: | 1170 | 102F | 113.7 | 295.9 |
| 210 MIN: | 1165 | 102F | 112.2 | 296.6 |
| 225 MIN: | 1150 | 104F | 109.8 | 300.9 |
| 240 MIN: | 1140 | 104F | 105.5 | 306.9 |
| 251 MIN: | 1140 | 104F | 80 | 370 |
| TOTAL RUN TIME: 4:11 | | | | |

FIG. 8

BATTERY TYPE                        CROWN 80-125-25
NUMBER OF CELLS                     80
CELL TYPE                           LEAD ACID
CELL DIMENSIONS                     N/A
AVERAGE VOLTAGE OF EACH CELL        2.14V
TOTAL VOLTAGE OF BATTERY            170.7V

MOTOR TEST INFORMATION WITH A 30HP LOAD AND 110V OUTPUT

| TIME | SPECIFIC GRAVITY | AVERAGE INTERNAL TEMPERATURE | BATTERY VOLTS | BATTERY AMPS |
|---|---|---|---|---|
| START: 9:00AM | 1280 | 76F | 158.5 | 198.2 |
| 15 MIN: | 1280 | 78F | 158.1 | 197.1 |
| 30 MIN: | 1280 | 78F | 157.3 | 205.9 |
| 45 MIN: | 1275 | 80F | 156.7 | 210 |
| 60 MIN: | 1270 | 80F | 156.4 | 210.1 |
| 75 MIN: | 1270 | 82F | 155.7 | 213.7 |
| 90 MIN: | 1265 | 82F | 155.2 | 214.3 |
| 105 MIN: | 1255 | 83F | 154.4 | 217.7 |
| 120 MIN: | 1255 | 84F | 153.9 | 217.9 |
| 135 MIN: | 1245 | 84F | 153.3 | 218.2 |
| 150 MIN: | 1235 | 85F | 152.6 | 218.9 |
| 165 MIN: | 1230 | 90F | 151.9 | 219.3 |
| 180 MIN: | 1225 | 92F | 151 | 221.8 |
| 195 MIN: | 1220 | 92F | 150.2 | 222.8 |
| 210 MIN: | 1210 | 94F | 149.2 | 224.2 |
| 225 MIN: | 1205 | 96F | 148.3 | 225.3 |
| 240 MIN: | 1200 | 97F | 147.2 | 228.4 |
| 255 MIN: | 1190 | 98F | 146 | 229.7 |
| 270 MIN: | 1185 | 98F | 144.4 | 234.7 |
| 285 MIN: | 1185 | 98F | 142.6 | 239.3 |
| 300 MIN: | 1165 | 100F | 140.8 | 237.6 |
| 315 MIN: | 1160 | 100F | 138 | 241.1 |
| 330 MIN: | 1155 | 101F | 130.6 | 258.5 |
| 342 MIN: UV | 1145 | 104F | 80(UV) | 370 |
| TOTAL RUN TIME: 5:42 | | | | |

FIG. 9

METHOD AND APPARATUS FOR INCREASING THE RUN TIME OF AN ELECTRIC CART

CROSS-REFERENCE TO RELATED PATENT APPLICATION

This application claims the benefit of U.S. Provisional Patent Application No. 60/817,363 filed on Jun. 30, 2006 in the U.S. Patent Trademark Office, the disclosure of which is incorporated herein in its entirety by reference.

BACKGROUND OF THE INVENTION

1. Field of the Invention

Apparatuses and methods consistent with the present invention relate to the electrical storage and supply system for providing electrical power to an electrical motor.

2. Description of the Related Art

In the mining equipment market, DC motors for scoops and coal haulers are typically rated at 110, 120 or 128 volts. For the past 50 years, battery operated DC wound motors have been rated at 128 volts or lower in their electrical operating systems. In past, it was typical for 128 volt battery systems to supply power to an electric motor rated as 128 volts. With some improvements in motor technology, more power could be generated such that an electrical motor rated at 110 volts could replace the electric motors rated at 128 volts. In order to permit replacement of the 128 volt motors with 110 volt motors, choppers were used to drop the battery packs 128 volt supply to 110 volts. This prevented equipment owners from having to replace their 128 volt battery packs with 110 volt battery packs.

Industrial batteries that are used in the mining industry provide power for underground mining equipment. DC (direct current) power is a chemical process to make electricity, for example, in one configuration positive and negative lead plates are submerged in an acid and water bath known as electrolyte. This process creates the electricity that powers the machines underground. The plates are typically encased in plastic jars and rated at 2 volts per cell which is one plastic jar. When fully charged, however, each cell will generate 2.15 to 2.17 volts. Because the output voltage of the battery varies as it is discharged, a standard is used. The industry standard is to assume 2 volts per cell and that is how the industry routinely measures the size of the battery tray. For example, a 64 cell battery would be referred to as a 128 volt battery, although at full charge the battery may output in excess of 130 volts. A battery tray usually consists of 64 cells but some machines require different numbers of cells, such as 24, 48, and 60.

Typically, the industry standard over the last 50 years in the mining industry for battery-operated machinery was to match the voltage of the battery to the voltage rating of the motor. An engineer would receive information from the manufacturer of the motors and design batteries to fit the voltage of each motor based on the rated voltage of the motor.

Generally speaking, the rotational speed of a DC motor is proportional to the voltage applied to it, and the torque is proportional to the current. Torque and current are linearly proportional to each other, as are speed and voltage. Under a fixed load (torque) voltage and current will also be proportional to each other. The generated torque is dependent on the current (I) and factors determined by the materials and internal geometry of the motor. Since the construction of a finished motor will not change during operation, a constant proportionality between the motor current and the geometry dependent factors can be calculated for a given motor. This constant, the torque constant (Kt) describes the torque generated by the motor for a specific motor current.

$$Kt = T/I \qquad \text{Eq. (1)}$$

In other words, the current I through the motor equals the torque produced T divided by the torque constant Kt. Thus, the DC motor rotational speed is proportional to the voltage applied to it, and the torque is proportional to the current.

Battery vehicles in the underground mining industry have had ever increasing productivity demands while being constrained by the available battery power supply. The production of these vehicles is measured in tons carried per shift. This is significantly affected by how many hours of life the battery tray can provide without the need for recharging. Ideally, a battery should last an entire shift. However, this can be as long as 10 hours in some mines.

As the productivity demands increase, manufacturers have found it necessary to put larger amp-hour cells in their battery trays. Unfortunately, the selection of cells available from the battery manufacturers is limited to only a handful of distinct sizes, which are often difficult to fit into the existing spaces fitted on the vehicles. Thus, there is a desire for another method to increase the run time of these electric vehicles within existing space requirements.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above. The present invention provides a method and apparatus for increasing the total run time of a DC motor supplied by a battery on a single charge by increasing the battery pack voltage potential.

According to an aspect of the present invention, provided is a method for increasing the running time of an electric apparatus operated by an electric motor connected to a battery power source using a motor controller, the method comprising: increasing the voltage of a battery power supply above a rated electric motor voltage; operating the motor controller to reduce the increased battery power supply voltage to the rated voltage of the electric motor.

According to an aspect the voltage of the battery power supply may be increased at least 18.7% above the rated electric motor voltage.

According to another aspect the rated voltage of the electric motor is rated at a voltage of at least one of 110 volts, 120 volts and 128 volts, and the battery supply voltage is increased to at least 152 volts.

The voltage of the battery power supply may be increased to at least 26.6% or 38.1%.

According to another aspect of the present invention, an electric motor cart is provided and includes: an electric motor having a rated motor voltage; a battery pack having an output voltage exceeding the rated motor voltage; a motor controller converts the output voltage to an electrical power supply which decreases the output voltage to supply power to the electric motor.

According to an aspect of the present invention, the output voltage of the battery pack is at least 18.7% greater than the rated motor voltage.

According to an aspect of the present invention, the rated voltage of the electric motor is at least one of 110 volts, 120 volts and 128 volts, and the output voltage is increased to at least 152 volts, but could go as high as 300 volts depending on the machine type or the battery type.

The voltage of the battery power supply may be increased to at least 26.6% to 38.1%, but may be more for larger battery packs.

According to another aspect of the present invention, an electrical control system is provided and includes: a battery pack power supply which supplied electrical energy; a motor controller which decreases a voltage of the electrical energy supplied by the battery pack to supply motor power at a motor voltage; and an electric motor which converts the motor power to torque.

The motor controller may decrease the voltage of the electrical energy supplied by the battery pack by a range of 15.7 percent to 30.5 percent.

BRIEF DESCRIPTION OF THE DRAWINGS

The above and other aspects and features of the present invention will become more apparent by describing in detail exemplary embodiments thereof with reference to the attached drawings in which:

FIG. 5 is a table of test results of a 128 volt battery.

FIG. 6 is a table of test results of a 152 volt battery.

FIG. 8 is a table of test results of a 128 volt battery.

FIG. 9 is a table of test results of a 160 volt battery.

DETAILED DESCRIPTION OF THE INVENTION

Many DC motors are built to handle surges of power in excess of their rated power. After experimenting with various motors this has been confirmed as long as the voltage increase does not exceed a threshold value based on the design of the motor's electrical system. The use of chopper drives including an Insulated Gated Bipolar Transistor ("IGBT"), as it is known in the industry, was developed, and is the latest state-of-the-art design. In the case where the average voltage applied to the motor is varied by switching the supply voltage very rapidly, the voltage of the battery may be increased a certain amount above the motor's ratings without damage to the motor, when an IGBT is used.

Additionally, it has been discovered that by purposely increasing the voltage of a battery pack, the duration of useable power from the battery may be increased by an unpredictable amount.

The motor and drive types that are typically used on these sort vehicles are DC motors and chopper drives, however, the present invention is not so limited. The chopper drive is a uniquely simple design which provides a relatively high amount of power transfer from the battery to the motor. While capable of providing complete speed control of the motor, it also has remarkable efficiencies in the 98-99% range over the entire speed range of the motor. This near unity efficiency is also responsible for the lower battery amperage draw when the drive provides lower voltages to the motor. Specifically, the battery amps are approximately equal to the motor amps multiplied by the ratio of the motor volts over the battery volts.

Hereinafter, the present invention will be described more fully with reference to the accompanying drawings, in which exemplary embodiments of the invention are shown.

Figure 1:
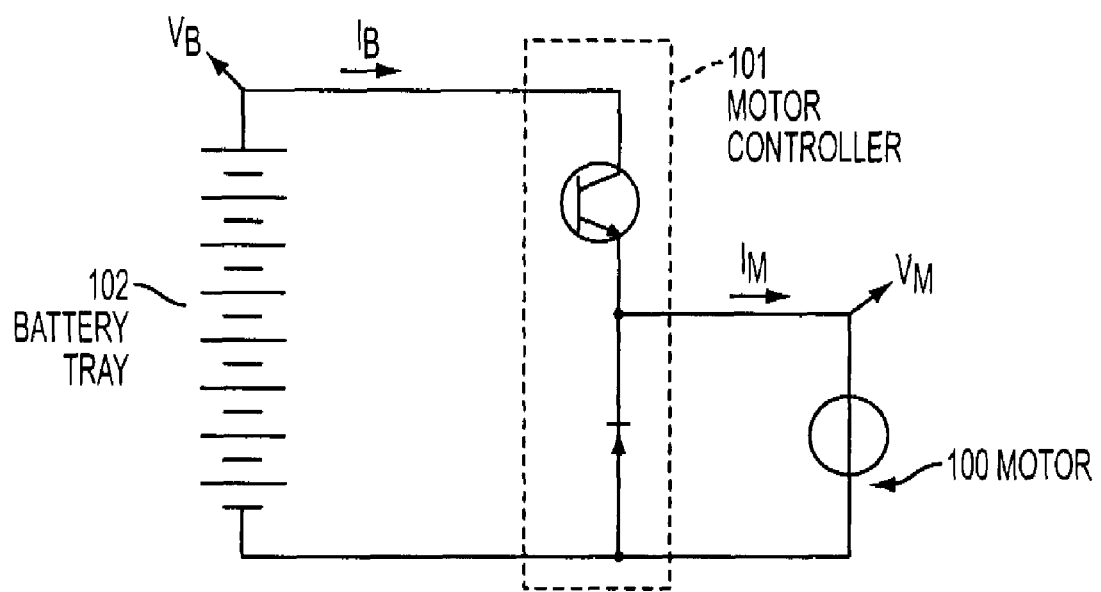
FIG. 1 is a conceptual diagram schematically illustrating a battery tray, electric motor and motor controller in accord with an exemplary embodiment of the present invention.

For example, as illustrated in (FIG. 1), if the Battery voltage equals 128 volts and the chopper drive allowed full voltage to the motor (that is $V_B$ and $V_M$ both equaled 128 volts), and the Motor amperage draw $I_M$ was 100 Amps, then the Battery amperage draw $I_B$, would also be 100 Amps. As in this example, if the Battery tray had 8 extra cells (other batteries could have more extra cells), its voltage $V_B$ would be 144 Volts. For the machine to go the same speed as with the original tray, the Chopper Drive would take this higher tray voltage and reduce it to 128 volts at the motor. The motor would pull the same 100 Amps; however, the Battery tray would only pull:

$$I_B=100\times128/144=89 \text{ Amps}$$

This reduced battery draw is especially helpful when the battery is nearing its discharged state. When this happens, not only does its voltage level decay significantly, its internal resistance also increases significantly. When this happens, an operator finds that he often can only tram the vehicle back to the charger in low speed, if at all. This is because in low speed, the voltage fed to the motor by the drive is low. Therefore the battery amps become proportionally lower when compared with the constant motor amperage draw.

If, on the other hand, the number of cells is increased in series with those in the tray, and the chopper drive (such as a Cableform, Inc. IGBT motor controller) is also programmed to restrict maximum motor voltage level to that of the original tray's design, the battery amperage draw can be additionally reduced to levels that can extend the battery tray's shift life (one charge cycle). The main advantage of this concept is that the added cells would be easier to design into the tray than filling the tray with larger amp-hour cells.

As technology moves forward, choppers will ultimately control voltage to the point that fewer and fewer ampere hours will be needed and smaller space configuration will be necessary to provide the same power to the motor. However, if the space is available in existing underground mining equipment, this space can be used for additional cells which will provide extra voltage resulting in longer daily service cycles and increased battery life. By inserting increased cell voltage into the battery system, more "stiffness" in the voltage is created because volts multiplied by ampere equals watts. Each cell has a given kilowatt rating and the kilowatt per cell multiplied by the number of cells gives a higher kilowatt hour capacity. But, by adding more cells you create a bank of more kilowatts, thus the motor life is extended.

Test Results

Figure 2:
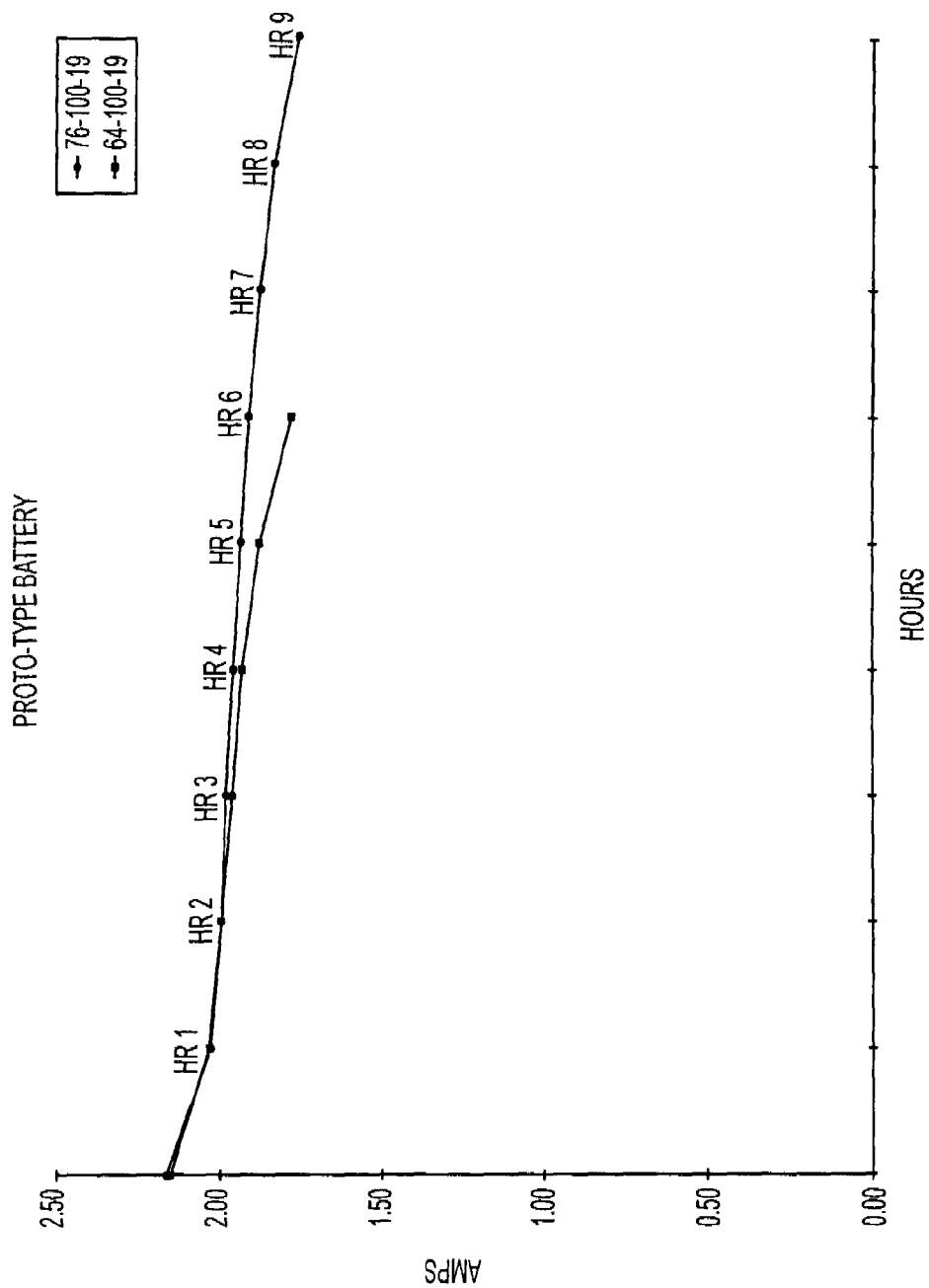
FIG. 2 is a graph representing the results of a comparison between a 128 volt battery configuration and a 152 volt battery configuration.

FIG. 2 represents the result of the first test configuration which illustrates the unpredictable increase in the run time of the battery pack for a single charge due to an increase in the battery pack voltage. In this comparison, one set of batteries was configured as a 64 cell, 900 amp, 128 volt battery system (136.3 volts at full charge) and the other as a 76 cell, 900 amp, 152 volt system (163.7 volts at full charge).

To test the effective running time of the batteries, each battery pack was connected to a motor in an electric cart elevated on blocks and run until a low battery shut off meter registered 66%. As is illustrated in FIG. 2, while the 64 cell, 128 volt battery ran for 6 hours before reaching the low battery shut off threshold, the 76 cell, 152 volt configuration ran for 9 hours before reaching the same threshold. Thus, the 18.75% increase in battery voltage at the same amp-hour capacity resulted in a 50% increase in effective run time. Consequently, increasing the space (via adding cells) consumed by the battery tray by 18.75% resulted in 50% more run time.

Figure 3:
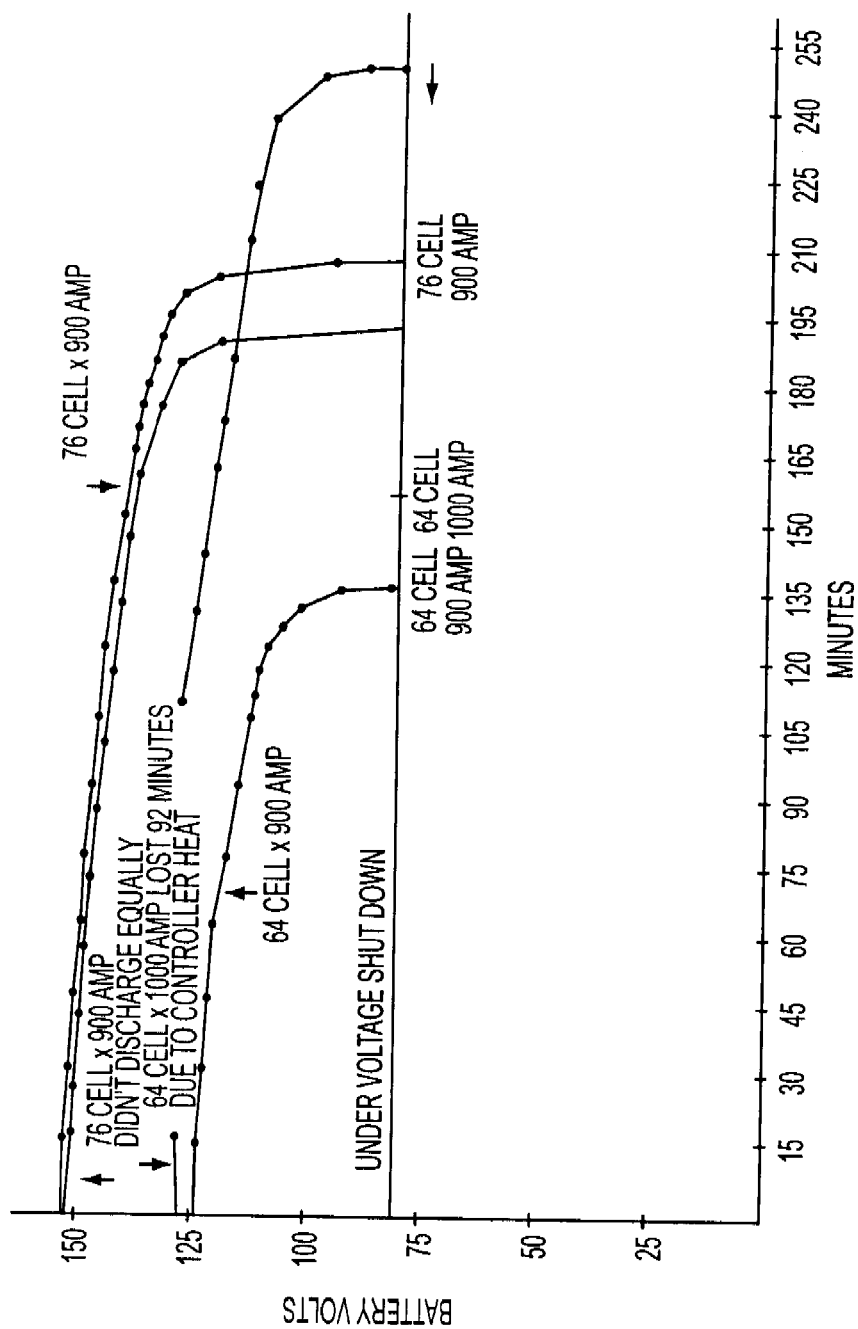
FIG. 3 is a graph representing the test results of the discharge time of various battery pack configurations.
Figure 4:
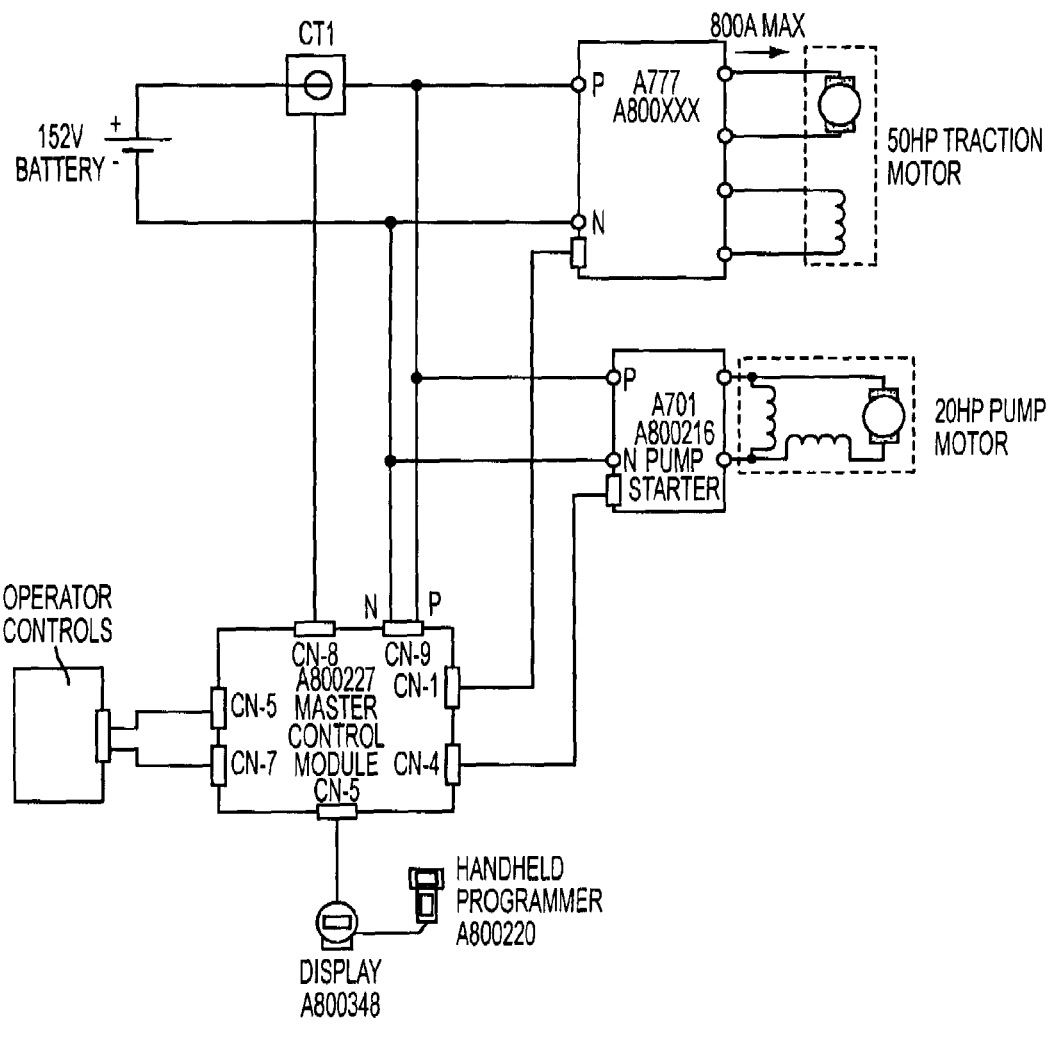
FIG. 4 is a block diagram illustrating a configuration of a 152 volt battery pack connected to an A777 motor controller and a traction motor.

FIG. 3 represents the results of two additional testing/comparison configurations. These additional tests were performed using a ECB 200 A & W dynamometer and Saminco A777 motor controller and a A2400X108 scoop traction motor. The 110 volt motor was loaded to 30 hp to simulate actual operating conditions. FIG. 4 is a block diagram illustrating the test configuration with the 152 volt battery pack.

The first of these tests were run using a 64 cell, 1000 amp, 128 volt (136.3 volts at full charge) battery system and a 76 cell, 900 amp, 152 volt (163.7 volts at full charge) battery system. In this case, the 128 volt battery system discharged in 170 minutes (total run time). As shown in the FIG. 3, the test was shut off for 92 minutes on the 128 volt battery system in order to dissipate the controller heat. This time was subtracted from the total test time to obtain the total run time. In comparison, the 152 volt battery system discharged in 194 minutes. While this represented only 14.1% increase in total run time, the 152 volt system was run on a hot motor, and also had lower amp-hour capacity of 100 amps. However, because the resistance in the motor/controller increases when a motor is running hot, and the 152 volt battery system was run immediately subsequent to the 128 volt battery system, a second test was set up such each battery system was tested on a motor/controller having the same temperature starting points.

In the second test, a 64 cell, 900 amp, 128 volt battery system was run in comparison to a 76 cell, 900 amp, 152 volt battery system. Both battery systems have the same 900 amp hour capacity. The test was performed under the same conditions using the ECB 200 A & W dynamometer and the Saminco A777 motor controller and a A2400X108 scoop traction 110 volt motor loaded to 30 hp, except that the motor was cooled to an ambient temperature between tests.

As shown in FIG. 3, the 128 volt battery discharged in about 140 minutes. The 152 volt battery discharged in about 209 minutes representing an increase in run time of 49.29%.

Additionally, during the testing the battery voltages corresponding to the four configurations illustrated in FIG. 3 were measured. After one hour the 1000 amp/128 volt battery lost 4.08% of its starting voltage. The 900 amp 152 volt battery lost only 1.2% of its starting voltage. This results in a lower discharge curve on the battery. Consequently, as the current drain on the battery is reduced, the efficiency of the battery is increased.

The effects on the motor controller were also quantified. The 128 volt, 1000 amp battery produced a draw of 265 amps at 120.7 volts or 31,714 watts after one hour, while the motor controller produced 109 volts at 276 amps or 29,962 watts. This resulted in a loss of 1752 watts in the controller.

In contrast, the 152 volt, 900 amp battery produced a draw of 220 amps at 148.7 volts or 32,174 watts after one hour, while the motor controller produced 108.71 volts at 280.5 amps or 30,493 watts. This resulted in 2221 watts of losses in the controller. Thus, the 152 volt battery generated approximately 25% more heat in the motor controller than the 128 volt battery.

However, because the stiffer voltage of the 152 battery system as compared to the 128 volt battery system, at later stages in the discharge cycle, undervoltage in the motor is prevented by using the increased voltage. When in an undervoltage condition, the work required by the motor causes an excessive current draw. This generates more heat in the motor windings. The brushes are required to handle more current and the efficiency of the commutation is reduced. Additionally, the brush holders reach excessive temperatures. Thus, while the 152 volt battery increased the heat generated in the motor controller, at the start of the test, it provided a better working constant power source for the electric motor throughout the discharge cycle, thus minimizing undervoltage. Consequently, by adding additional cells to raise the voltage 18.7%, an additional 49% of total run time may be realized.

While the tests noted above were conducted using an electric motor rated at 110 volts. The 128 volt battery system may also be combined with a 120 volt or a 128 volt motor. Consequently, the 152 volt battery system may be implemented on an electric motor rated at 120 volts or 128 volts. Thus, in these configurations, the voltage of the battery pack may be increased by 26.6% in the case of the 120 volt rated motor and 18.7% in the case of the 128 volt rated motor. In the case of the electric motor rated at 110 volts, the voltage of the battery pack may be increased to 38.1%.

During the testing of the various battery packs, the specific gravity and temperature was sampled to ensure the batteries were operating within their generally accepted operating ranges. FIG. 5 illustrates the voltage, specific gravity, the average internal temperature, the amperage draw and load for the 128 volt battery throughout the test. FIG. 6 illustrates the same properties for the 152 volt battery pack. It is generally accepted that a fully charged battery operates in a specific gravity range of 1.275-1.315 and with an internal temperature range of 77 degrees Fahrenheit to 120 degrees Fahrenheit. During the testing, the temperature of the 128 volt battery ranged from 85 degrees at the start, to 106 degrees at the end of the testing. The temperature of the 152 volt battery ranged from 96 degrees Fahrenheit to 118 degrees Fahrenheit. Additionally, when connected to the load via the motor controller, initial battery output voltage of the 128 volt battery was 123.4 volts. This output battery voltage dropped to 80 volts when the undervoltage condition occurred (battery deemed discharged). Regarding the 152 volt battery, the initial voltage was 150.5 when initially connected to the load, and this value dropped to 80 volts by the time the undervoltage condition occurred.

In the case of the 128 volt battery pack, the motor controller dropped the initial output voltage from 124.5 volts to 110 volts (motor voltage) and in the case of the 152 volt battery pack dropped the initial output voltage from 150.5 volts to 110 volts in order to supply power to the electric motor. Before reaching the undervoltage condition in the 152 volt battery pack configuration, the battery output voltage of 131.8 volts was dropped to 110 by the motor controller. Thus, the motor controller was used to decrease this stiff voltage by a range of 26.9% to 16.5% of the battery output voltage.

In yet another test, a 64 cell, 1500 amp, 128 volt (136.3 volts at full charge) battery system was run in comparison to an 80 cell, 1500 amp, 160 volt (170.7 volts at full charge) battery system. Both battery systems have the same 1500 amp hour capacity. However, the 80 cell, 160 volt battery pack was only about 90% charge as the specific gravity was in the 1.270 range in comparison to a reading of 1.285-1.290 in a fully charged battery. The test was performed under the same conditions using the ECB 200 A & W dynamometer, a Saminco A777 motor controller and a A2400X108 45 HP 110 volt traction motor loaded to 30 hp.

Figure 7:
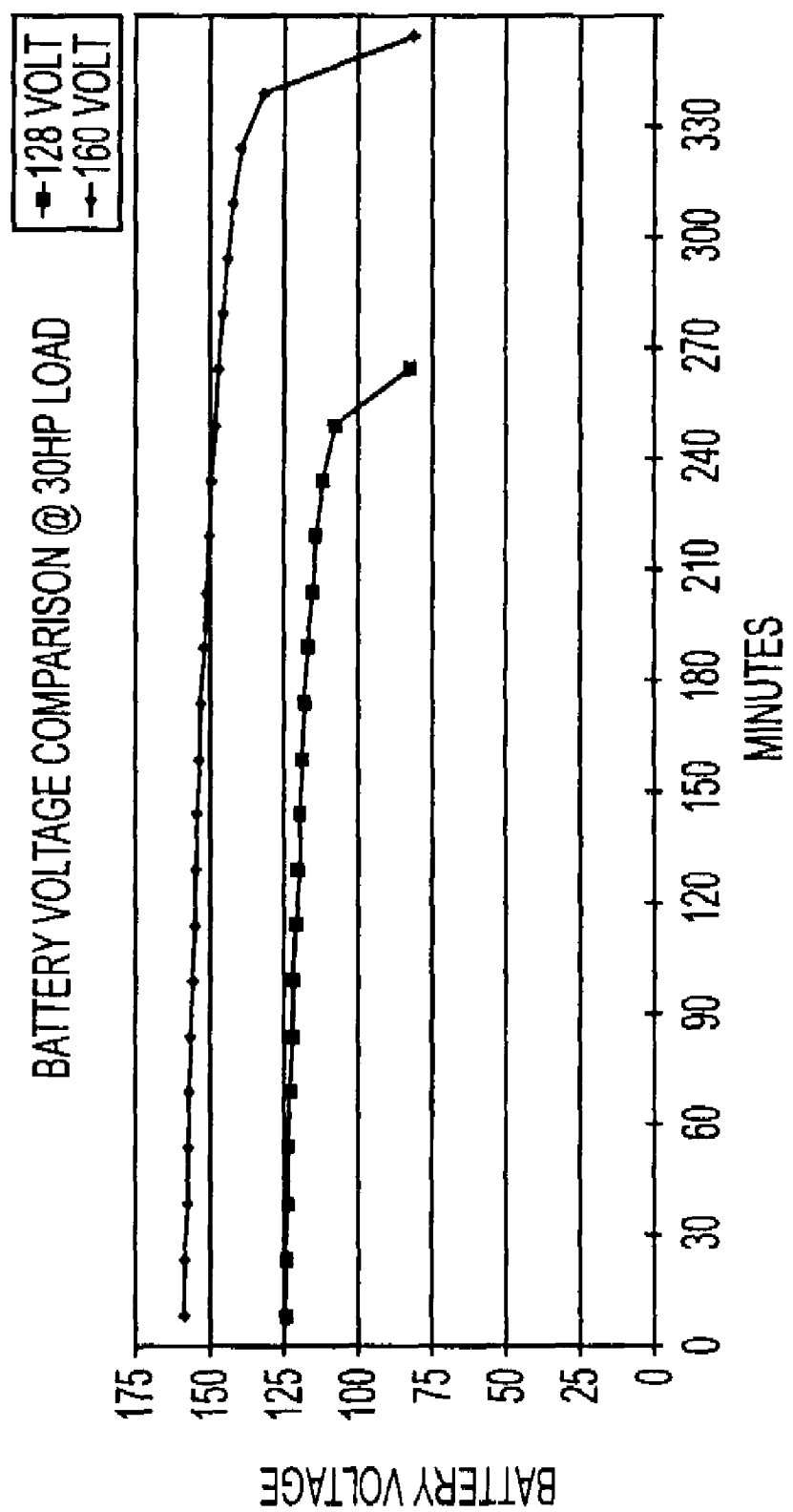
FIG. 7 is a graph representing the test results of the discharge time of various battery pack configurations.

As shown in FIG. 7, the 128 volt battery discharged in about 251 minutes. The 160 volt battery discharged in about 342 minutes representing an increase in run time of 36% despite only being 90% charged. Consequently, if the 160 volt battery pack was at full charge, a run time of 377 minutes would be expected. This would represent a 50% increase in run time. Thus, in this case, a 25% increase in the battery pack voltage may translate into a 50% increase in total run time.

Regarding specific gravity and temperature measurements, the 128 volt battery decreased from a specific gravity of 1.285 to 1.140, while the 160 volt battery decreased from a specific gravity of 1.270 to 1.145. The temperature of the 128 volt battery increased 75 degrees Fahrenheit to 104 degrees Fahrenheit, while the 160 volt battery increased from 76 to 104 degrees Fahrenheit.

As shown in FIG. 8, the output voltage of the 128 volt battery pack was 124.5 volts when initially loaded. This output voltage decreased to 80 volts as the undervoltage condition occurred. Regarding the 152 volt battery pack, FIG. 9 shows the output voltage was 158.5 volts at initial loading. This value decreased to 80 volts as the undervoltage condition occurred.

In the case of the 128 volt battery pack, the motor controller dropped the initial output voltage from 124.5 volts to 110 volts (motor voltage) and in the case of the 160 volt battery pack dropped the initial output voltage from 158.5 volts to 110 volts in order to supply power to the electric motor. Before reaching the undervoltage condition in the 160 volt battery pack configuration, the battery output voltage of 130.6 volts was dropped to 110 by the motor controller. Thus, the motor controller was used to decrease this stiff voltage by a range of 30.5% to 15.7%.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for increasing the running time of an electric apparatus operated by an electric motor connected to a battery power source using a motor controller, the method comprising:
   providing a battery power supply voltage above a rated electric motor voltage;
   operating the motor controller to reduce the battery power supply voltage to the rated voltage of the electric motor, wherein the voltage of the battery power supply is at least 25% above the rated electric motor voltage.

2. The method according to claim 1, wherein the rated voltage of the electric motor is rated at a voltage of at least one of 110 volts, 120 volts and 128 volts, and the battery supply voltage is increased to 152 volts or more.

3. The method of claim 1, wherein the voltage of the battery power supply is increased at least 38.1% above the rated electric motor voltage.

4. The method of claim 1, wherein the increased battery power supply voltage is reduced by at least 15.7 percent.

5. The method of claim 1, wherein the increased battery power supply voltage is reduced by at least 26.9 percent.

6. The method according to claim 1, wherein the electric motor propels an electric vehicle.

7. The method according to claim 1, wherein the electric motor consumes substantially all of the power supplied by the battery power source per unit time.

8. The method according to claim 1, wherein the electric motor is a direct current motor.

9. An electric motor cart, comprising:
   an electric motor having a rated motor voltage;
   a battery pack having an output voltage exceeding the rated motor voltage;
   a motor controller which controls power supplied to the electric motor by decreasing the output voltage of the battery pack,
   wherein the output voltage of the battery pack is at least 25% greater than the rated motor voltage,
   wherein the electric motor drives the electric motor cart.

10. The electric motor cart according to claim 9, wherein the rated voltage of the electric motor is at least one of 110 volts, 120 volts and 128 volts, and the output voltage is increased to at least 152 volts.

11. The electric motor cart according to claim 9, wherein the output voltage of the battery pack is at least 38.1% greater than the rated motor voltage.

12. The electric motor cart according to claim 9, wherein the motor controller decreases the output voltage of the battery pack by at least 15.7 percent.

13. The electric motor cart according to claim 9, wherein the motor controller decreases the output voltage of the battery pack by at least 26.9 percent.

14. The electric motor cart according to claim 9, wherein the electric motor propels the electric motor cart.

15. The electric motor cart according to claim 9, wherein the electric motor consumes substantially all of the power supplied by the battery pack per unit time.

16. The motor cart according to claim 9, wherein the electric motor is a direct current motor.

17. An electrical control system for an electric cart, comprising:
   a battery pack power supply which supplies electrical energy;
   a motor controller which decreases a voltage of the electrical energy supplied by the battery pack to supply motor power at a rated motor voltage;
   an electrical motor which converts the motor power to torque,
   wherein an output voltage of the battery pack is at least 25% greater than the rated motor voltage.

18. The electrical control system according to claim 17, wherein the motor controller decreases the voltage of the electrical energy supplied by the battery pack by at least 16.9 percent.

19. The electrical control system according to claim 17, wherein the motor controller decreases the voltage of the electrical energy supplied by the battery pack by at least 26.9 percent.

20. The electrical control system according to claim 17, wherein the motor controller decreases the voltage of the electrical energy supplied by the battery pack by a range of 15.7 percent to 30.5 percent.

21. The electrical control system according to claim 17, wherein the electric motor propels the electric cart.

22. The electrical control system according to claim 17, wherein the electric motor consumes substantially all of the power supplied by the battery pack power supply per unit time.

23. The electrical control system according to claim 17, wherein the electrical motor is a direct current motor.

* * * * *